J. FRANTZ.
Fruit-Gatherer.
No. 62,623.
Patented Mar. 5, 1867.
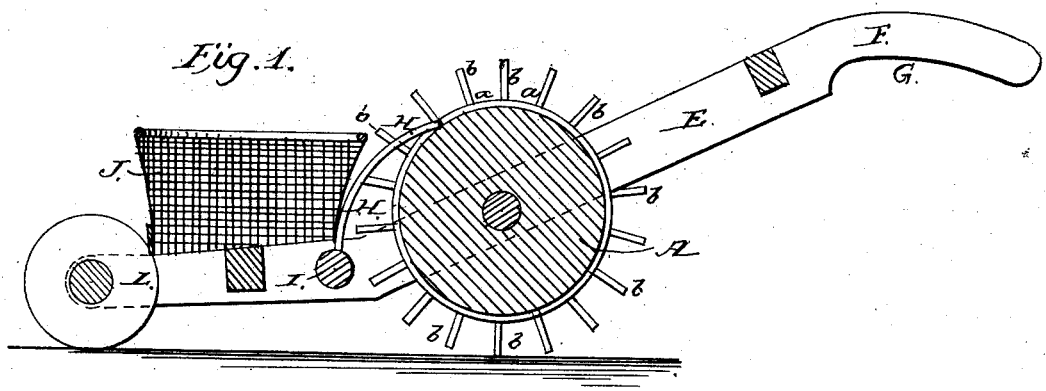
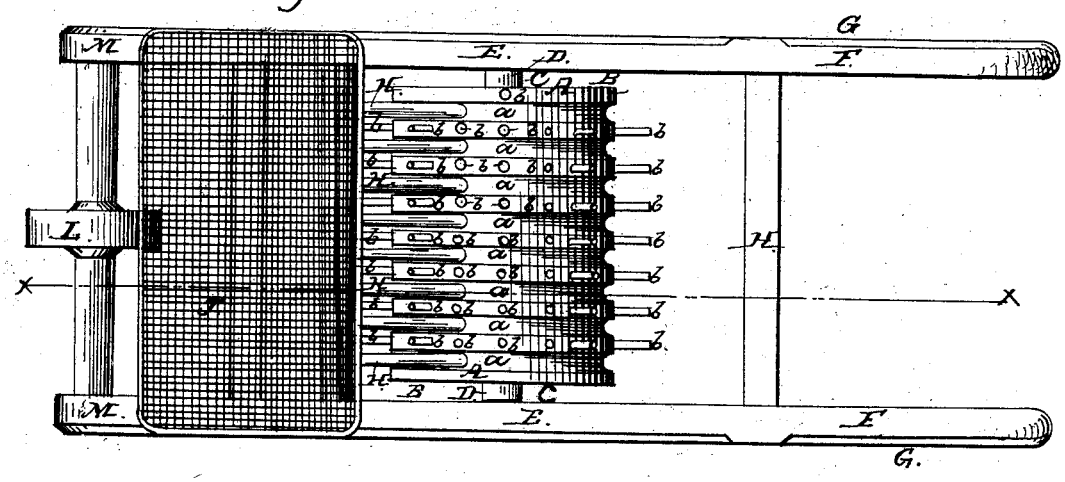
WITNESSES:
Theo Tusch
Wm Trwin
INVENTOR:
J. Frantz
Per Munn & Co.
Attorneys

United States Patent Office.

JOHN FRANTZ OF JOSEPH, OF SELBY'S PORT, MARYLAND.

Letters Patent No. 62,623, dated March 5, 1867.

---

IMPROVEMENT IN FRUIT GATHERERS.

---

The Schedule referred to in these Letters Patent and making part of the same.

---

TO ALL WHOM IT MAY CONCERN:

Be it known that I, JOHN FRANTZ OF JOSEPH, of Selby's Port, in the county of Alleghany, and State of Maryland, have invented a new and improved Fruit Gatherer; and I do hereby declare that the following is a full, clear, and exact description thereof, which will enable others skilled in the art to make and use the same, reference being had to the accompanying drawings, forming part of this specification.

This invention relates to a machine which is of such a construction and arrangement of parts that when rolled or passed over the ground it will gather therefrom any apples, potatoes, or other fruit which may be strewed in the path of its movement, taking them up and throwing or depositing them into a basket or other suitable receptacle attached or placed upon the machine in proper position therefor, as will be obvious from the following detail description of the machine, reference being had to the accompanying plate of drawings, in which—

Figure 1 is a plan or top view of the machine; and

Figure 2, a longitudinal vertical section, taken in the plane of the line $x$ $x$, fig. 1.

Similar letters of reference indicate like parts.

A, in the drawings, represents a cylinder or drum, which in a machine suitable for being run over the ground by hand or manual labor, should be about two feet long and the same in diameter, and made of a series of staves about one inch thick, extending in the direction of its length, and secured at each end by nailing or in any other proper manner to round or circular heads or plates, B. In the centre of each head, B, of the cylinder the square ends of similar axles, C, are inserted, by the round portion D of which axles the drum or cylinder is hung in and between the two arms E, one upon each head of the cylinder. These arms E at their ends F are turned off to form suitable handles, G, and between such handles and the side of the roller toward the same a cross-bar, H, is placed and secured for bracing the said arms E. The cylinder drum A is provided with a series of grooves, $a$, extending entirely around its periphery and at equal distances apart and parallel to each other. Between the several grooves $a$ a row of similar pins, $b$, are inserted in the cylinder or drum, projecting in radial lines therefrom, about one inch apart, and in lines straight, or nearly so, and parallel to each other. In the several grooves $a$ of the cylinder or drum A the free and outer ends of finger-bars H rest, which finger-bars at their other ends are secured to a common cross-bar or roller, I, secured in and between the side arms E, hereinbefore referred to, at the rear side of the drum or cylinder A. Back of the finger-bars H a basket or receptacle, J, is placed, across from one side arm, E, to the other, which basket may be made of wire netting, gauze, or other suitable material, and is to receive the apples, potatoes, or other fruit that by the action of the machine, to be hereinafter described, is gathered or picked up by it from the ground over which the machine is run. The basket J may be kept or retained in place upon the machine in various ways, it being desirable, however, that such an attachment or mode of securing should be used as would enable the basket to be readily removed from and attached to the machine at pleasure. L is a roller or wheel, hung by its centre axle-shaft in and between the ends M of the side arms E in a similar manner to that of the wheel of an ordinary wheel-barrow.

In the use of the machine above explained, it is taken by its handle G and run over the surface of the ground upon which the apples, potatoes, or other fruits are strewed that are to be gathered thereby; the teeth of the cylinder or drum A, as the machine is thus run over the ground, entering the apples, etc., sufficiently deep to carry them up and toward the highest point of the cylinder, where, by the action of the finger-bars upon them, they are drawn off of the said pins or teeth, rolling down from the drum into the basket or receptacle J, arranged to receive and catch them. If the apples or other fruit have been all gathered at one place and there are others near by, by raising the drum from the ground, with the apples, etc., on its teeth, and running the machine on its roller L to another place where apples, etc., are strewed, they can be also picked or gathered up; it being plainly apparent that when the basket or receptacle J has become filled it is to be removed and emptied and again replaced on the machine or another one in its stead.

By a machine of the construction and arrangement of parts above explained, apples, potatoes, and other fruit strewed upon the ground can be gathered or taken up with the utmost rapidity, and in an extremely simple and effective manner.

I claim as new, and desire to secure by Letters Patent—

The drum or cylinder A, provided with grooves, $a$, and teeth or pins, $b$, in combination with the finger-bars H and receptacle J, all arranged and operating in the manner and for the purpose specified.

JOHN FRANTZ OF JOS.

Witnesses:
TRUMAN WEST,
SAML. W. FRIEND.